Jan. 20, 1953 E. M. MAY 2,625,912
HYDRAULIC APPARATUS, INCLUDING A DRIVE MOTOR
AND AUTOMATIC CONTROL MEANS FOR THE MOTOR
Original Filed Dec. 30, 1946 4 Sheets-Sheet 1
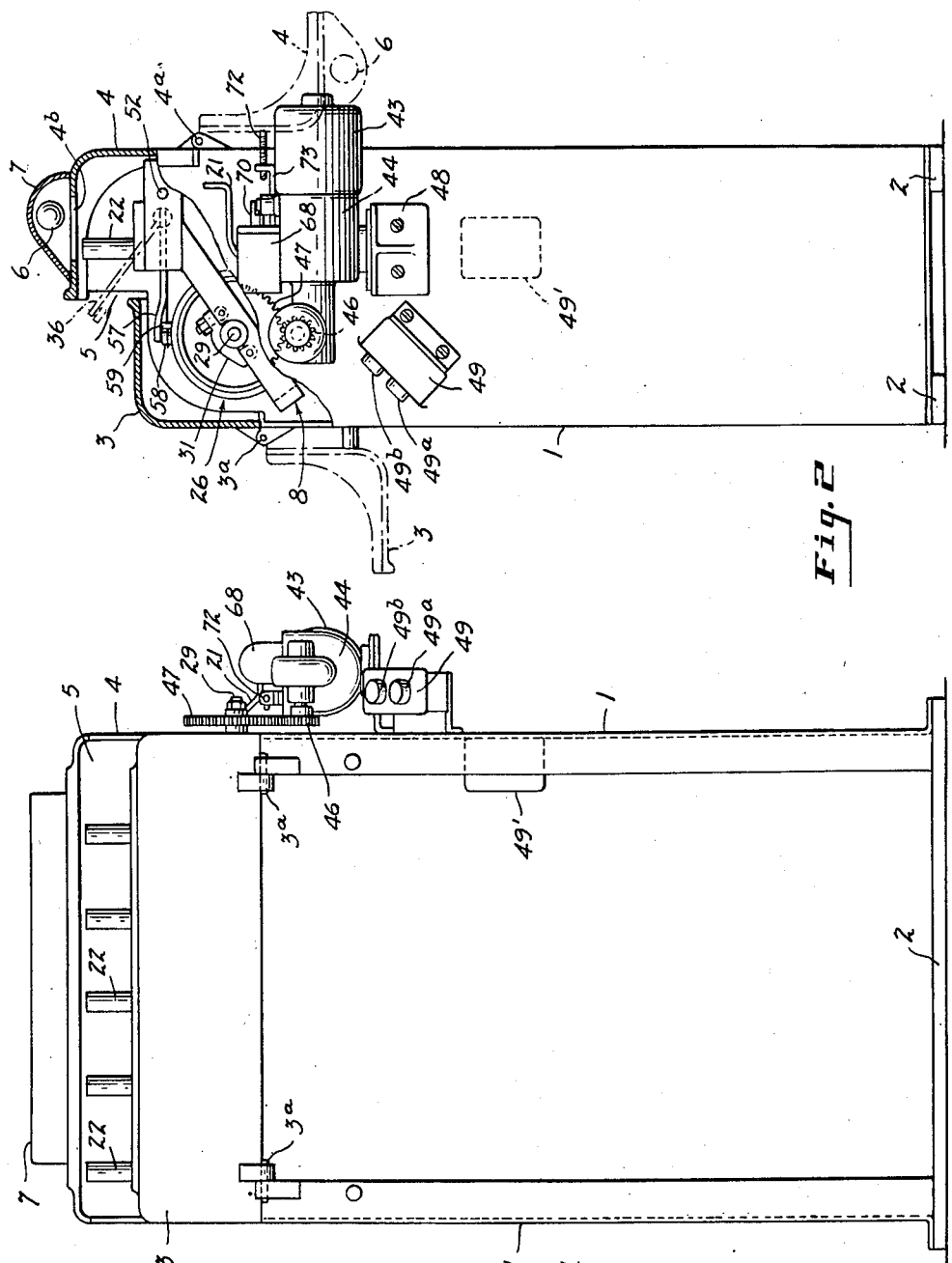
INVENTOR.
Edward M. May
BY
Gehr and Leonard
ATTORNEYS

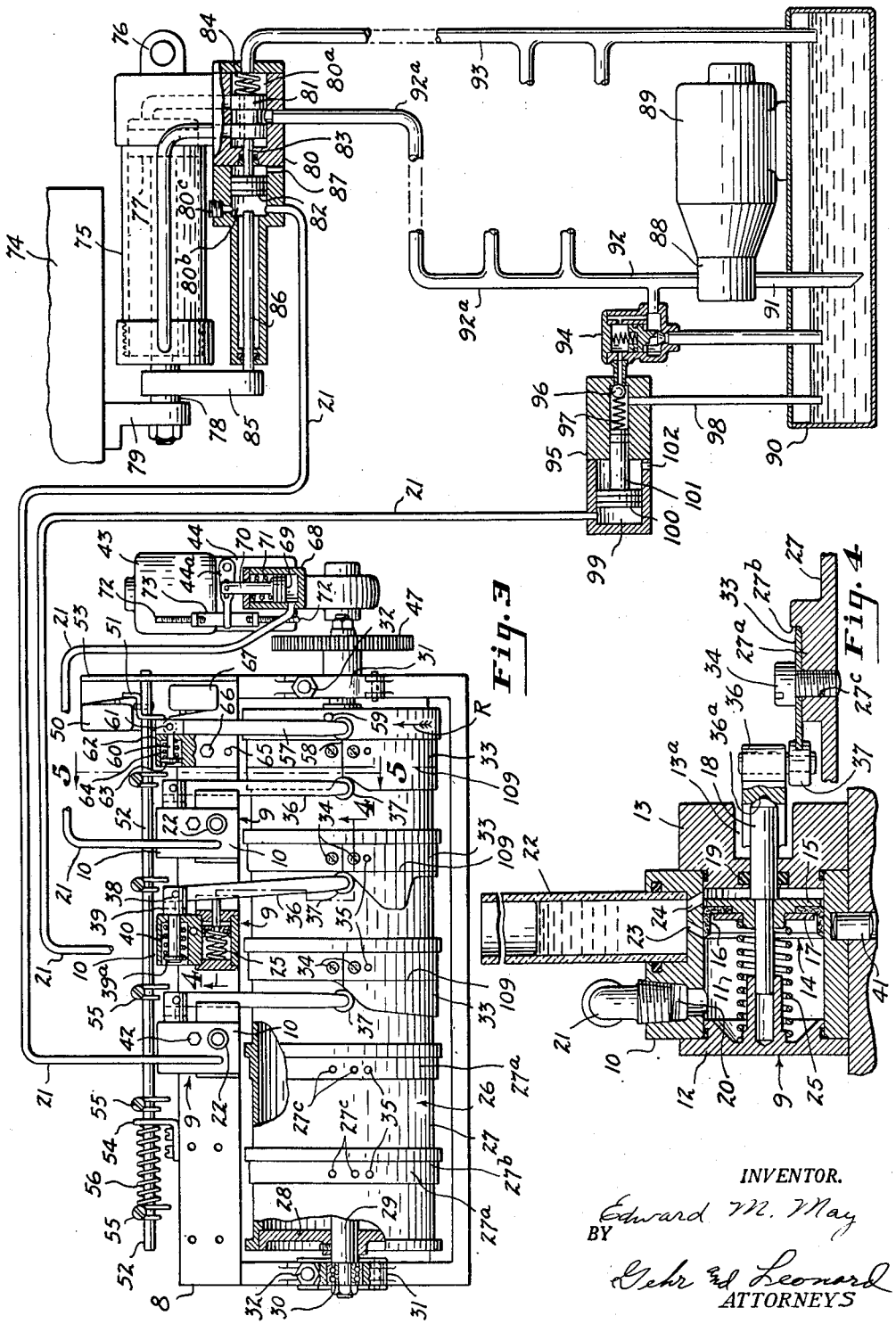

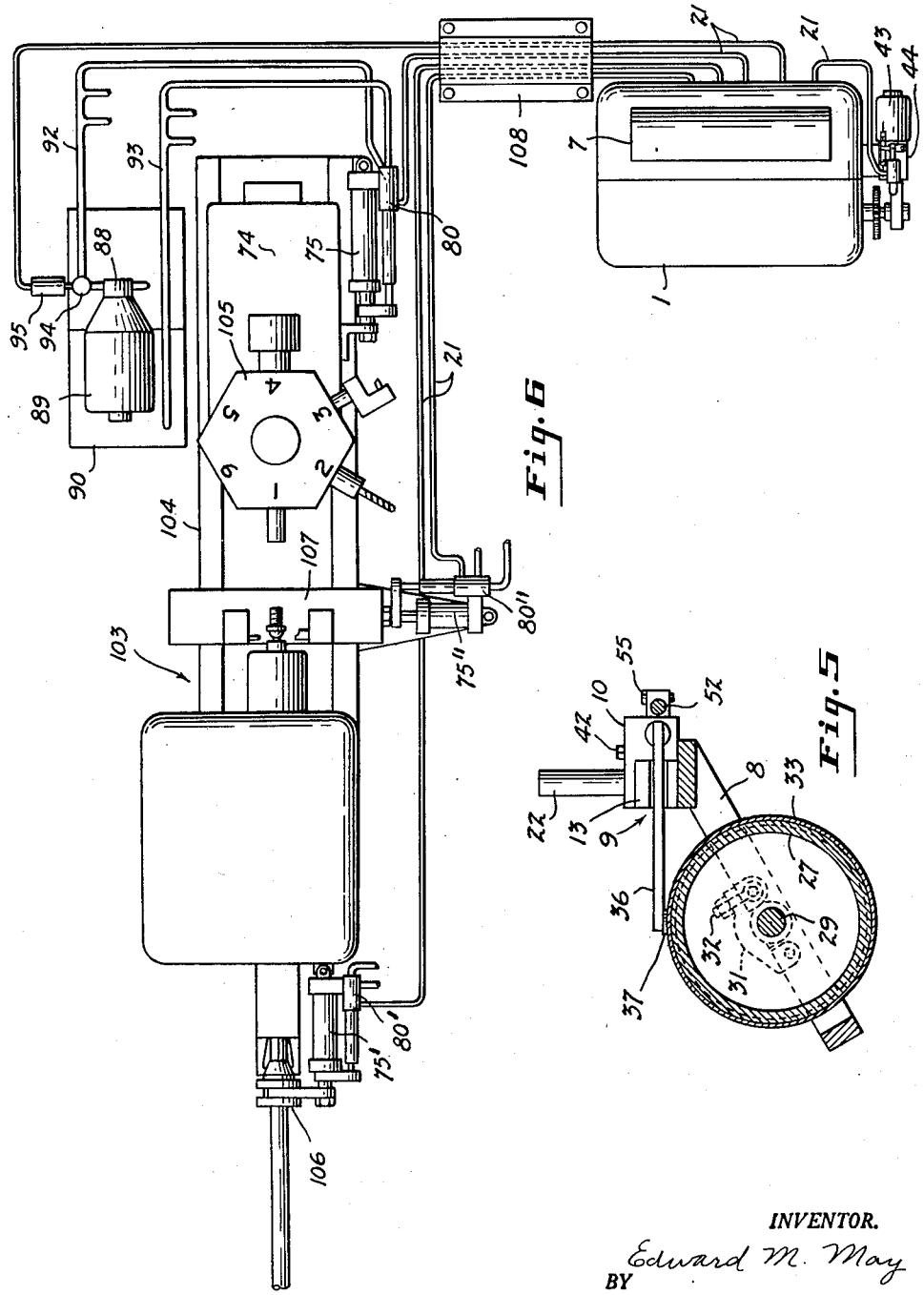

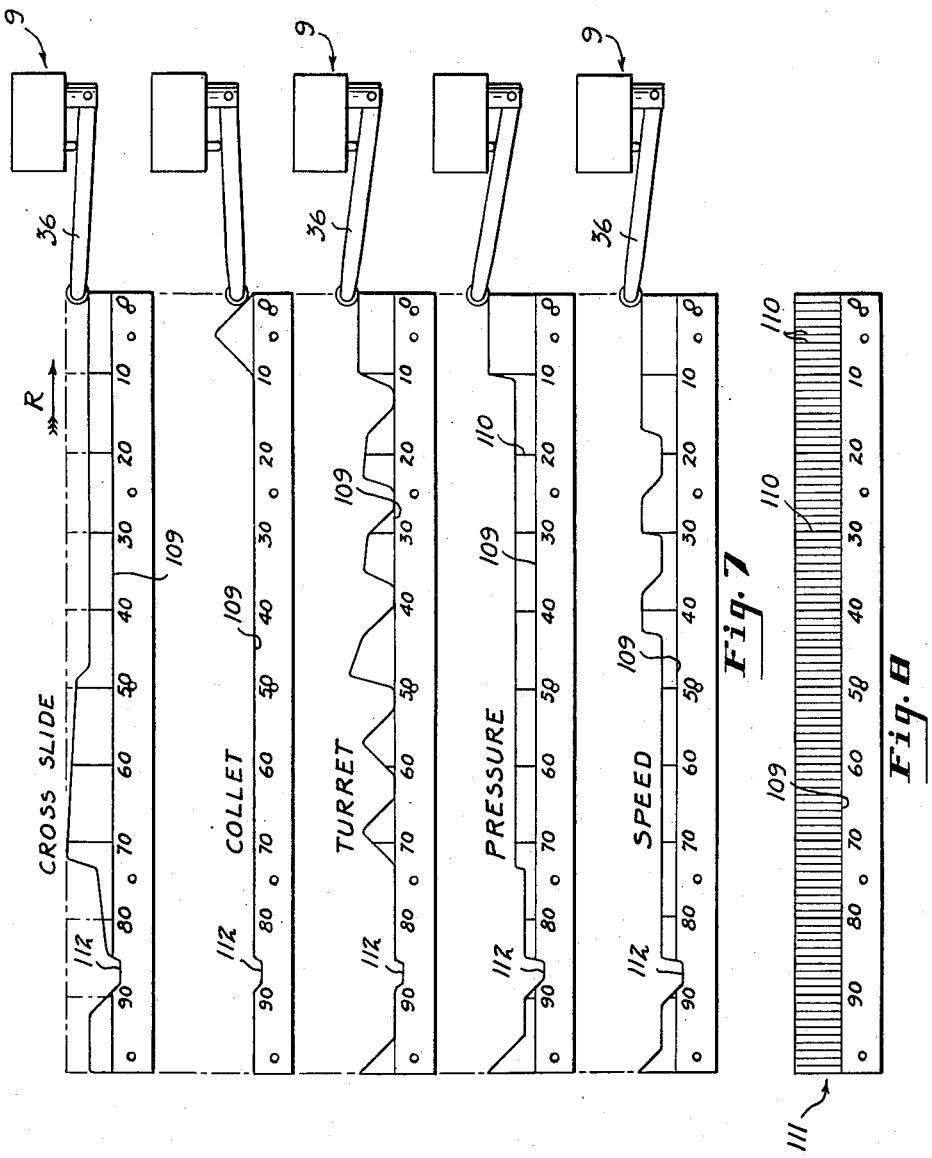

Patented Jan. 20, 1953

2,625,912

UNITED STATES PATENT OFFICE 2,625,912

HYDRAULIC APPARATUS, INCLUDING A DRIVE MOTOR AND AUTOMATIC CONTROL MEANS FOR THE MOTOR

Edward M. May, Detroit, Mich., assignor to Meco-Pilot Manufacturing Company, Detroit, Mich., a corporation of Michigan Original application December 30, 1946, Serial No. 719,305. Divided and this application October 3, 1951, Serial No. 249,481

3 Claims. (Cl. 121—45)

The invention relates to hydraulic apparatus comprising a hydraulic motor and automatic means for controlling the operation of the motor. The present application is a division of my earlier application Serial No. 719,305, filed December 30, 1946.

The present invention has for a principal object the provision of hydraulic motor and motor control apparatus in which the control means is capable of varying the pressure of the working fluid supplied to the motor in accordance with variations in the load which the motor is required to carry.

A further object of the invention is to provide apparatus comprising a hydraulic motor and control means therefor in which the control means serves both to vary the pressure of the working fluid of the motor and to vary its own speed and thereby vary the speed of movement of the motor.

Other objects of the invention more or less incidental or ancillary to those stated will be apparent from the following description of an exemplary embodiment of the invention shown in the accompanying drawings.

For the attainment of the stated objects the invention consists in certain forms, arrangements and combinations of parts hereinafter explained and definitely pointed out in appended claims.

In the drawings,

Fig. 1 is a front elevation of unitary mechanism comprising main parts of the motor control means of the apparatus.

Fig. 2 is a right side elevation of the apparatus shown in Fig. 1 with a portion of the casing structure broken away to show interior parts and with hinged cover portions of the casing structure shown in closed position by full lines and in open position by dashed lines.

Fig. 3 is a view partially diagrammatic showing a hydraulic motor, a machine element connected to be driven by the motor, power driven pump means for supplying power liquid for the hydraulic motor and the principal parts of the control means for the hydraulic motor, the unitary part of the control means being shown in plan on an enlarged scale with some parts of the mechanism omitted and other parts shown in section to disclose interior construction.

Fig. 4 is an enlarged sectional view on the broken line 4—4 of Fig. 3 with some parts of the structure broken away.

Fig. 5 is a section on the line 5—5 of Fig. 3.

Fig. 6 is a plan view, more or less diagrammatic, showing the invention as applied to the actuation of a turret lathe.

Fig. 7 is a diagrammatic view indicating the hydraulic transmitters of the control apparatus and a series of actuating cams in developed form such as would be appropriate in the use of the invention for the control of the turret lathe.

Fig. 8 is a face view of a cam blank useful in the design and fabrication of cams such as are shown in Fig. 7.

Referring now in detail to the structures illustrated in the drawings, numeral 1 designates as an entirety (Figs. 1 and 2) a cabinet designed to rest upon the floor and house a hydraulic transmitter apparatus in accordance with the invention. The cabinet is preferably built up of sheet steel and is fitted with a pair of bottom skids 2, 2 adapted to slide upon the floor when the apparatus is moved. The front of the cabinet may be left open as shown but the top is partially closed by cover sections 3 and 4 which are hinged on the body of the cabinet at 3a and 4a, respectively, so that they can be swung downward to the positions shown in dotted lines to give free access to the apparatus within the cabinet and at the same time serve as shelves for tools and parts when changes and adjustments of the apparatus are being made. The rear cover 4 is disposed at a higher level than the front cover 3 so that an inspection opening or window is provided at 5 for a purpose which will presently appear. The cover 4 is formed in its top portion with an opening 4b over which are arranged an electric light bulb 6, preferably of the elongated tubular type, and a reflector 7, the purpose of the light being to illuminate parts of the enclosed apparatus as viewed through opening 5.

Within the upper part of the cabinet 1 is a rectangular frame 8 secured to the walls of the cabinet by bolts or screws (not shown), the said frame being inclined downwardly from the rear to the front of the cabinet as shown in Fig. 2. As best shown in Fig. 3, the rear side of frame 8 carries a series of hydraulic transmitters 9, 9 two of which have been omitted to facilitate disclosure of other parts. Each transmitter comprises a block 10 formed at its front end with a transverse cylinder chamber 11 (Fig. 4). This chamber is closed at its respective ends by heads 12 and 13. Within chamber 11 is a piston structure 14 comprising a disc 15, hydraulic packing 16 and retaining ring 17. The piston is fast on a rod 18 which is guided at one end in a boss carried by the head 12 and at its other end extends through an aperture in the head 13 fitted with a suitable hydraulic packing 19. The cylinder block 10 is formed on its top side with a threaded aperture 20 to which is connected a conduit 21 designed to connect chamber 11 with receiver apparatus which will later be described.

The cylinder block 10 of each transmitter is also formed with a top recess to receive an upright, open-topped tubular reservoir 22 of transparent material such as plastic or glass. The reservoir is designed to hold oil or other working liquid for the transmitter and has its joint with block 10 packed to prevent leakage. Passages 23 and 24 lead from the bottom of the reservoir 22 into the cylinder chamber 11, the passage 24 communicating with chamber 11 adjacent the closure head 13 while passage 23 communicates with chamber 11 at a point intermediate passage 24 and passage 20. With this arrangement the packing 16 of the piston structure serves to close the passage 23 as the piston moves forward on its working stroke. A coil spring 25 is interposed between the piston 14 and the head 12 and is adapted to retract the piston following its working stroke.

To effect the working stroke of the piston 14 cam devices are provided comprising a horizontal cylinder 26 having a cylindrical shell 27 and end discs 28, 28 which are centrally apertured and secured by set screws or the like on a supporting shaft 29. Shaft 29 in turn is supported by antifriction bearings 30 in the respective ends of frame 8. To permit easy removal of the cylinder structure as a unit the end sections of frame 8 are fitted with swinging bearing caps 31 which are hinged at their front ends to the frame and are disengageably secured at their rear ends by swinging bolts 32.

The cylinder 26 is formed peripherally to receive a series of circumferentially extending cams 33, 33, one for each of the transmitters 9, 9. That is to say, the cylinder has a series of circumferentially extending cam seats 27a extending radially somewhat beyond the main surface of the shell 27, and adjacent each seat surface 27a the shell is formed with a circumferentially extending shoulder 27b to engage and locate one of the cams, each of which has a straight longitudinal edge affording a reference surface to cooperate with the locating shoulder 27b. Each cam 33 is preferably formed from an elongated relatively thin strip of metal or other material susceptible of being manually bent from the flat state to circular form and preferably also possessing sufficient elasticity to return substantially to the flat state when released. Aluminum alloy sheet material of suitable temper is a satisfactory material for the purpose.

Each of the cams 33 is provided adjacent its two ends with apertures to receive securing screws 34, 34 which engage threaded holes 27c, 27c of the cylinder drum 27, and is also provided adjacent one end with a dowel hole to engage a dowel pin 35 attached to drum shell 27. Each cam may if desired be provided with additional securing screws spaced around the periphery of the cam drum. As will be apparent from Fig. 3, each of the cams 33 has one longitudinal edge formed with various lobes or active cam sections to effect desired movements of its hydraulic transmitter through the cam follower provided for that purpose. Such follower is in the form of a lever arm 36 fitted at its free end with a roller 37 to engage the cam and pivotally supported at its other end in position to engage the projecting end of the piston rod 18. The pivotal support for the arm 36 is afforded by pin 38 carried by the head of a bolt 39 having a swiveling support in the rear part of receiver block 10. With this construction the follower arm 36 can be raised when desired, as indicated by dotted lines in Fig. 2 to permit removal of the cam cylinder 26 from frame 8. The swiveling bolt 39 is fitted with a washer 39a and a coil spring 40 which engages the bolt washer and yieldingly presses the head of the bolt against the adjacent face of block 10 (Fig. 3). To support the roller 37 in operative engagement with the edge of the cam 33 the side of follower arm 36 where it engages the piston rod 18 is formed with an angular groove or depression 36a as shown in Fig. 4. The engagement between the arm and the end of the rod is normally maintained by the tension of the spring 25. As is shown in Fig. 4 the follower arm 36 during normal operation lies within a slot 13a of the cylinder head 13.

For reasons later explained it is desirable to be able to adjust the transmitter blocks 10 in relation to the supporting frame 8 and to this end each block is secured to the frame by a pivot pin 41 (Fig. 4) and a clamping screw 42 which passes through a hole in the block 10 somewhat larger than the shank of the screw so that the block can be adjusted around the axis of pin 41.

Rotation of the cam drum is effected by an electric motor 43 which is connected to drive a variable speed mechanism 44 which in turn is connected through worm and wheel gears to drive a pinion 46 meshing with a spur gear 47 fast on shaft 29 of the cam drum. Preferably the motor, variable speed mechanism and worm and wheel gears constitute a unitary device which is supported on the end of cabinet 1 by a suitable bracket 48. With the described gear connection between the motor and the cam drum the removal of the latter from its supporting frame involves merely the disengagement of the bearing caps 31 and separation of spur gear 47 from the driving pinion 46. For control of motor 43 it is connected in circuit with switch and relay devices 49 and 49', respectively, of well known construction, the switch having a starting button 49a and a stop button 49b. Further reference will be made to these manual control devices later in the description.

The apparatus is further provided with safety devices comprising an emergency switch 50 which is connected in circuit with motor 43. Switch 50 is normally held in its closed position by means of a double-ended dog 51 fixedly secured to a rod 52 which is slidably mounted in bracket 53 and 54 attached to the frame 8 (Fig. 3). Dogs 55, 55 are adjustably clamped on rod 52, each a little to the right of the head of one of the pivot bolts 39. A coil spring 56 which is interposed between one of the dogs 55 and bracket 54 urges rod 52 toward the left. Rotation of the rod 52 is prevented by the disposition of the arms of dog 51 adjacent the horizontal surface of the bracket 53. With this arrangement if the discharge of any one of the transmitters should be blockaded or movement of the cam follower be in any way obstructed the spring 40 of the pivot bolt will yield and permit the follower arm 36 to swing about the end of piston rod 18 as a pivot with resultant movement of the sliding rod 52 toward the right and the opening of emergency switch 50.

With the hydraulic transmitters actuated by the circular or endless form of cams it is apparent that a cycle of transmitter movements is effected for each rotation of the cam drum 26.

For the control of some types of machines and operations it may be desirable for the control mechanism, when started manually by switch button 49a, to run continuously for the performance of a considerable number of control cycles and then be stopped by manual switch button 49b. In other cases, however, it may be desirable to stop the control mechanism at the end of each cycle and have the apparatus started again manually. To this latter end means are provided to open emergency switch 50 at the end of each rotation of the drum 26. Said means comprise a lever arm 57 fitted at its front end with an antifriction roller 58 arranged to be engaged by a radial pin 59 carried by cylinder 26. At its rear end the arm 57 is slotted to receive the end of eye bolt 60 to which the arm is pivotally connected by pin 61. Bolt 60 has a swiveling support in block 62 carried by frame 8 and is fitted at one end with a washer 63 which is engaged by spring 64 to hold the arm 57 yieldingly against the side surface of block 62. The rear end of arm 57 is engaged by the front end of dog 51 on the sliding rod 52 and normally serves as a positive stop limiting movement of rod 52 by spring 56. With this construction when the control apparatus is started by actuation of the starting switch 49a the cam drum 26 rotates, in the direction of arrow R, until pin 59 engages roller 58 to swing the arm 57 around the right front corner of block 62 as a pivot with resultant movement of the rear end of arm 57 to the right. This movement carries dog 51 to the right and opens emergency switch 50 to stop the drive motor 43.

In order to insure the proper positioning of roller 58 in relation to the pin or dog 59, block 62 is adjustably secured to frame 8 by means of pin 65 and clamping screw 66, the clamping screw having a sufficiently loose fit in the block to permit the relatively small range of needed adjustment. When multiple cycle operation without manual control is desired it is only necessary to block up arm 57 to remove roller 58 from the path of dog 59, such positioning of arm 57 being permitted by the swivel mounting of bolt 60.

An additional motor control switch 67 is mounted on bracket 53 with its actuating arm disposed adjacent the rear end of arm 57. The switch which is normally open, is closed by the above described swinging movement of arm 57. The purpose of switch 67 will appear at a later point in the description.

It is desirable that the stopping of the cam mechanism be effected without any considerable overrun when the control switch is actuated. To this end the motor 43 is preferably equipped with a magnetic brake so that it will stop promptly when deenergized. Alternatively (and at less cost) use may be made of well known switch and relay circuit means adapted to give the desired quick stopping.

The invention contemplates automatic control of the variable speed mechanism 44 through which motor 43 is connected to drive the cam drum 26. To this end gearing 44 is provided with a crank arm 44a connected to actuate the speed varying means of the mechanism. As has been stated any suitable form of speed varying mechanism can be employed but that manufactured by Graham Transmissions Inc., of Milwaukee, Wisconsin, and shown in U. S. Patent No. 2,405,957, has been found satisfactory for use. Crank arm 44a is actuated by a hydraulic receiver comprising cylinder 68 and piston 69 having a rod 70 with a pin and slot connection to arm 44a. One end of cylinder 68 is connected by a conduit 21 with one of the hydraulic transmitters 9. Thus the hydraulic impulse of the transmitter serves to move the piston 69 against the tension of a retracting spring 71 interposed between the piston and one end of cylinder 68. The speed change mechanism and the connections between it and arm 44a are such that the piston movement opposed to spring 71 increases the speed transmitted through pinion 46 and gear 47 to the cam drum. Movement of piston 69 in the reverse direction by spring 71 correspondingly reduces the speed transmitted to the cam cylinder. To determine the maximum and minimum speeds which may be thus automatically provided by the hydraulic mechanism adjustable screws 72, 72 are mounted on bracket 73 carried by the casing of mechanism 44 and serve to limit the swinging movement of lever 44a.

By means of the described hydraulic devices for determining the speed of rotation of the cam drum 26 it is possible by the provision of a suitably shaped cam for actuating the transmitter connected to cylinder 68 to vary the speed of cam movement at will throughout the cycle of rotation of the cam drum.

In Fig. 3 of the drawings is shown more or less diagrammatically a machine element, hydraulic motor devices and pressure fluid supply means for the motor devices connected in a typical manner to the hydraulic transmitter control mechanism already described. The machine element 74 may be taken as a portion of the turret slide of the turret lathe shown in Fig. 6. Associated with the slide is a hydraulic motor comprising a cylinder 75 anchored at 76 and having a piston 77 with rod 78 connected by arm 79 to the slide element 74. This hydraulic motor is fitted with a hydraulically actuated control valve of the follow type. The valve comprises a casing 80 providing a chamber 80a for a spool valve 81 and a chamber 80b for an actuating piston 82 having its rod 83 extending into chamber 80a to urge the valve 81 toward the right against the tension of spring 84. The chamber 80b is connected on the left side of piston 82 with one of the conduits 21 leading to one of the hydraulic transmitters 9. Piston rod 78 of the main motor carries an arm 85 to which is attached a follow rod 86 extending into chamber 80b. The latter chamber, on the right side of piston 82, is open to the atmosphere through vent 87 so that no working fluid for the main motor can leak past the packing of rod 83 and affect the control piston.

A pump 88 of constant delivery type is directly driven by motor 89 mounted upon the top of a sump chamber 90. The pump has its intake connected by a suction pipe 91 with the interior of sump 90 and has a discharge pipe 92 with various branches to supply a plurality of hydraulic motors. One such branch 92a is shown connected to the inlet port of valve casing 80. The right end of the control valve chamber 80a discharges to a return pipe 93 delivering into sump 90. Pipe 93 may also have branch return lines leading into it as indicated in Fig. 3.

To control the pressure of the working fluid delivered to the hydraulic motor or motors served by it discharge pipe 92 is fitted with a by-pass valve 94 of well known construction. As already stated, an object of the present invention is to provide means for automatically varying the pressure of the working liquid supplied to the controlled motor or motors and to this end valve 94 equipped with relief valve devices comprising casing 95, ball valve 96 and coil spring 97 which yieldingly urges the valve against the inlet port of casing 95, the outlet port being connected by conduit 98 to sump 90. To automatically vary the tension of spring 97 casing 95 is provided with a chamber 99 for hydraulic piston 100 having a rod 101 engaging the end of spring 97. With chamber 99 connected as shown through a conduit 21 with one of the hydraulic transmitters 9 the impulse of the transmitter, determined by its actuating cam, serves to vary the tension of spring 97 and hence the pressure at which the valve 96 opens to control the opening of by-pass valve 94. Casing structure 95 is provided with a relief port 102 on the right side of piston 100.

From what has been said it is apparent that the control apparatus is adapted automatically to control the amounts or distances of the power-driven movements of one or more machine elements, to control the pressure of the working liquid supplied to the motor or motors of the machine elements during or in different parts of the movements of the said elements to thereby vary the force of the individual movements, to control the sequence in which the movements of the machine elements occur and also to control the speed with which the cycle or cycles of machine element movements, or parts of such cycles, are carried out.

To further illustrate the manner of applying the control apparatus to power driven machines Fig. 6 shows in plan view the application of the invention to a turret lathe. The figure shows the already described cabinet I with its variable speed motor drive mechanism and its series of hydraulic transmitter conduits 21, 21 and also shows the already described motor pump mechanism for supplying liquid under pressure to hydraulic motors to be automatically controlled, together with the turret lathe designated as an entirety by the numeral 103. The lathe has a frame structure 104 upon which the slide 74 carrying turret mechanism 105 is slidably mounted. Slide structure 74 is fitted with the motor and valve mechanism 75, 80 already described in connection with Fig. 3. A collet chuck mechanism 106 for gripping and advancing the work to the tools is similarly fitted with motor and control valve means 75', 80' and a cross slide mechanism 107 is similarly fitted with motor and control valve devices 75'', 80''. The turret, collet and cross slide devices are fitted with the usual limit stops (not shown) to positively limit their respective feed and retraction movements. The transmitter conduits 21 of the control apparatus are shown connected to the speed control and pressure control devices 44 and 95 and to each of the hydraulic motor devices, although the conduits to serve the motors of the collet and cross slide mechanism are partly broken away to avoid undue complications.

It will be observed that the cabinet-encased director is conveniently disposed in front of the lathe but spaced from it to provide passageway between the two devices and secure free access to both of them. The transmitter conduits 21 are conveniently disposed at floor level between the two machines and covered and protected by a floor plate 108.

By way of further explanation of the invention there is shown in Fig. 7 of the drawing an exemplary set of actuating cams suitable for controlling the operation of the turret lathe shown in Fig. 6. For clarity the cams are shown in their flat form detached from the supporting cam cylinder. From top to bottom of the figure the cams are designated "cross slide," "collet" (for feed of work piece), "turret," "pressure" and "speed," corresponding to the several control stations which have already been referred to in the preceding description. Fig. 7 also indicates in connection with each cam the follower arm 36 and transmitter 9 driven by it.

It is observed first that each of the cams 33 is marked with a longitudinally extending base line 109 which is spaced exactly at a standard distance from the reference edge of the cam and the surface of the cam at one side of this line is marked with transverse lines 110 dividing the length of the cam into 100 equal subdivisions (Fig. 8), every tenth subdivision being numbered from the starting end of the cam upward. The cams move in direction of arrow R.

From an inspection of Fig. 7 it will be seen that each of the cams has its active edge on or above the base line 109 except that at one point, in the case of each cam, a notch 112 is formed to permit the cam follower to move below the base line. The purpose of the notches 112 will be explained presently in tracing the operation of the apparatus.

*Operation*

Assuming that the control apparatus which has been described is provided with a set of cams such as are shown in Fig. 7 and the apparatus is to be connected as shown in Fig. 6 for the control of the turret lathe, in an initial use of the apparatus it would be appropriate to fill with working liquid the transmitter and receiver chambers and the conduits 21 connecting them. To facilitate the introduction of the working fluid the receiver part of the control valve casings 80 may be provided with air vent apertures normally closed by screw plugs such as shown at 80c (Fig. 3). Having removed or loosened plugs 80c the working liquid, which will preferably be colored red or some other striking color that will readily catch the eye, may be introduced into the open topped reservoirs 22 of the several receivers. With the transmitter pistons in their right hand positions and with the closure plugs 80c open to permit escape of air, the liquid will flow from the reservoirs through passage 23 into the transmitter chambers and thence through conduits 21 to the several receiver chambers, whereupon plugs 80c may be replaced or retightened. During the filling operations the cam follower arms 36 may be moved manually to actuate transmitter pistons 14 for the purpose of facilitating the filling of the conduits 21 and receiver chambers. The fact that conduits 21 are made of transparent material permits the detection of any air bubbles in the line, and upon discovery of such bubbles the nearest joint may be opened or loosened sufficiently to permit the trapped air to be vented to the atmosphere.

With the control system suitably filled with working fluid the next step in initiating operation of the apparatus is adjustment of the blocks 10 of the transmitters 9 to insure the proper positioning of the transmitter pistons 14 in relation to the passage 23 when the cam follower roller is tangent to the base line of the cams. Such adjustment can conviently be made before cams are attached to the supporting cylinder 26 by clamping on the cylinder in place of the cam a short gauge having a width equal to the distance between the base line of a cam and the right edge thereof, as viewed in Fig. 3, such gauge being moved from one cam seat to another as the blocks 10 are successively adjusted. In effecting the adjustment the anti-friction roller of arm 36 is held against the edge of the gauge, and with the clamping screw 42 loosened, block 10 is turned in the clockwise direction on pivot pin 41 to permit spring 25 to move the piston to the right of passage 23. The block 10 is then slowly turned in the opposite direction to effect movement of piston 14 toward the left (Fig. 4). During this movement the level of the liquid in reservoir 22 remains fixed until the front edge of piston packing 16 completely closes passage 23, at which point the level of the liquid starts to fall incident to flow through passage 24 into the space to the right of the piston. The start of the change in the liquid level thus indicates the point at which the clamping screw 42 is to be tightened to fix the block 10 in its proper working position. In this connection it will be apparent that the supporting bearings of the cam cylinder must be such as to avoid endwise movement of the cylinder.

With the adjustment effected in the manner stated the cam cylinder may be lifted from its bearing supports for the mounting thereon of cams suitable for the particular motor-driven machine or operation to be controlled. For the control of the turret lathe (Fig. 6) it may be assumed that the set of cams shown in Fig. 7 is employed. If the machine is to be stopped automatically at the end of each cycle the control arm 57 will be lowered into operative position to be engaged by dog 59 of the cam cylinder. The operator or attendant starts the operation by pressing button 49a of switch 49. The cam cylinder thereupon is rotated in the direction of arrow R (Fig. 3) to carry out the cycle of operations determined by the forms of the five cams.

As illustrative both of the kinds of considerations involved in the design of the cams and of the advantages attained with the present invention some of the characteristics of the cams of Fig. 7 are here noted. In the case of the turret cam there is a level-topped lobe between 0 and 10. This results in turret station 1 (Fig. 6) being held toward the left with the turret stop rod presented to the bar stock coming through the spindle. Correspondingly the collet cam has a rise and fall between 0 and 10, which causes the collet mechanism first to open and retract and then advance the bar stock through the spindle and close. This requires heavy hydraulic pressure for cylinder 75' which is provided for by making the pressure cam with a high lobe between 0 and 10 so that the pump 88 will provide its maximum pressure. It is desirable to operate the collet rapidly but the cam slope that can be used is limited to about 45° to prevent undue tangential stress. Consequently it is desirable to turn the cam drum rapidly and the speed cam is made high to provide the high speed. Meanwhile the cross slide cam is level at only half the maximum height to hold the cross slide in central or inoperative position.

At point 10 the turret cam drops (rapidly at first but more slowly at the end where the cam slope is curved) to retract the turret and index it to its number 2 position whereupon it is again returned to the work. As will be noted, the form of the cam for this return motion is first fast and then slower at feed rate as the drill engages the work, the flatter cam slope at 20 being for the feed motion. This operation takes some time and if the drum should continue to turn at high speed an undue portion of the drum circumference would be exhausted. Accordingly the speed is made low beginning at about 17.

Next there follows a fall and rise of the turret cam between 24 and 30 which indexes the turret to its number 3 position. Such indexing calls for a long rapid stroke so a corresponding rise between 24 and 30 is provided on the speed cam. Similarly turret tools 3 and 4 are fed through to 50 on the turret cam and then follows two indexes for the empty turret stations 5 and 6 to point 73 on the cam. Just as the last turret tool is retreating at 48 (turret cam), the cross slide advances to present the front forming tool. This is a long feed movement but there is plenty of cam length available to finish the operation so the moderate rotational speed is maintained as shown by the level section of the speed cam from 44 to 85. After the front forming cut is finished by the cross slide, its cam reverses at 74 and, between 75 and 85, presents the rear cut-off tool to cut off the work piece.

At some point in each rotation of the cam drum it is desirable to effect refilling of the hydraulic pilot systems and in the case of the turret lathe application it is convenient to provide each cam with a filler notch 112 between points 85 and 90 on the several cams. These notches fall below the base line 109 of the cams and, as will be recalled, this permits the front edge of packing 16 of piston 14 (Fig. 4) to pass to the right of passage 23 thus opening chamber 11 to reservoir 22. This allows replenishment to compensate for any slight leakage and to permit escape of air upward through the reservoir. The appearance of air bubbles rising in the reservoir will warn of a leak somewhere in the pilot system and the operator can promptly locate the leak and remove it.

Thus the pilot systems are normalized once in each cycle. In the present example this action occurs at the same time in all of the pilot systems but the filler notches of the cams can be located at any point that does not interfere with an active operation.

Between points 90 and 100 all the cams return to their original heights to match the zero ends thereof.

The cams are seen to be simple right angle coordinate graphs of the operations to be performed and can be laid out by any intelligent mechanic having a knowledge of the machine operations to be controlled. Furthermore the cams are light in weight and when dismounted from the drums take substantially their original flat form which facilitates their compact storage for use at a future date. They form and preserve a record of timing and feed rates that in other types of apparatus would have to be worked out anew with each repeated setup.

*Design considerations*

In the practice of the invention certain design considerations should be borne in mind. Thus the springs 40 (Fig. 3) associated with the pivot bolts 39 should be of a length to permit sufficient movement of the bolts to accommodate the full throw of the actuating cams so that if for any reason the safety switch 50 should fail to operate no harm will be done. The springs 40 should be stronger than the retraction springs 25 of the transmitters and spring 84 in the follow valve 80 so as not to yield under maximum normal pressure in the pilot system. The spring 56 associated with safety rod 52 should, of course, be strong enough to overcome friction of the rod 52 in its supports and close switch 50.

Spring 25 of the transmitters need not be a heavy one but is needed to retract piston 14 in case leakage from the system results in insufficient working fluid for spring 84 of the follow valve to return piston packing 16 of the transmitter far enough to uncover replenishment passage 23. In case of such fluid shortage a partial vacuum will be formed by the retraction of piston 14 by spring 25 with resultant collapse of packing 16 from the wall of chamber 11 and admission of working fluid to said chamber from the reservoir at any part of the return stroke.

The hydraulic pilot system comprising transmitter chamber 11, conduit 21 and receiver chamber 80b constitutes theoretically a rigid means of transmitting motion from cam 33 to piston 82 of the receiver. Practically this ideal is not realized. Cam follower arm 36 will flex slightly under load, the various hydraulic packings are resilient and slightly compressible and there is usually a slight amount of compressible air in the working fluid. Therefore for uniformity of action it is important to keep the load on the pilot system as nearly constant as possible. As this load is largely determined by spring 84 of the control valve this spring should be made sufficiently flexible so that it does not change pressure much in the stroke of valve 81.

When the controlled hydraulic motor is moving at constant speed (due to straight line slope of the control cam) the noted inaccuracies of the hydraulic pilot system have no effect because the follow valve is then stationary. However, the timing of the starting and stopping of the controlled motor and its changes in speed are affected by the inaccuracies and, accordingly, the system is particularly useful for the control of machine parts having movements determined by fixed stops of the machine, as in the case of the turret and cross slides and the collet of the turret lathe. The controls of the cam speed and of the working pressure of the power liquid do not call for high accuracy either as to amount or timing. In applying the present invention to the control of such definitely limited machine movements the yieldable mounting of the cam follower arms makes it possible to design the pilot cams to produce slightly longer transmitter strokes than are required to complete the power driven machine element movements to engagement with their respective stops; for when engagement with the stops occurs the small additional movements of the cam followers are accommodated by the yielding of springs 40. It is to permit such small movement of pivot bolts 39 without opening switch 50 that small clearances are provided between bolts 39 and dogs 55 (Fig. 3).

The control valve 81 can be made practically nonreactive to liquid flow through it. Rod 83 enters the power system on the exhaust side where the pressure is nominally zero. In practice this pressure varies widely and may rise to quite a high value. Rod 83 should therefore be made as small in diameter as is mechanically practical to minimize the effect of exhaust pressure variation. An adequate vent passage 87 is required to positively protect the pilot system from gaining oil from the power system.

In the design of the follow device for the motor control valve it should be observed that the movement of the motor piston 77 is determined by the cubic displacement of transmitter piston 14 in relation to the cubic displacement of the follow rod 86 of the hydraulic receiver. Thus if it is desired to provide a motor cylinder 75 with a longer stroke, rod 86 must be lengthened but correspondingly reduced in diameter. In a word the hydraulic motor with its hydraulically actuated follow valve constitutes a hydraulic power amplifier of known character.

In connection with the device for controlling the pressure of the power fluid, it might seem that the desired control is a mere matter of transmitting suitable pressure to the relief ball 96 (Fig. 3) and that resilience in the associated pilot system which applies the pressure would not be detrimental. However, it has been found necessary to make the pilot system as little reactive to exhaust pressure as possible. Accordingly the piston rod 101 which engages the spring 97 is made of small diameter relative to piston 100. If this is not done the device chatters badly.

In actuating machines by hydraulic pressure it is generally desirable to employ pressures only moderately higher than is necessary to do the required work. In the present improved apparatus the provision for the automatic variation of the pressure of the working fluid supplied to the power motors meets this requirement of moderate pressures. However, possible abnormal variation of operating conditions renders such provision of automatic control insufficient. Thus in the case of control of machine tools if a cutter developed marked dullness or if a slide were blockaded accidentally the actuating motor cylinder would be unable to follow the impulse of the pilot system and, as appears from Fig. 3, the follow rod 86 would not withdraw from the chamber 80a as fast as liquid was delivered from transmitter 9. Under these conditions it is apparent that the liquid in the pilot system would be blockaded and piston 14 of the transmitter would not respond to its actuating cam. In such a case spring 84 of the follow valve, depending on the position of the latter, might yield somewhat and afford some relief, but for general reliance it is clear that the yieldable mounting of the cam follower arm 36 and the safety switch provision of the director apparatus are needed.

In the illustrative embodiment of the invention disclosed herein the invention is applied to the direction of a power driven machine having movements of its elements accurately determined in amount by fixed stops forming parts of the machine, but it is to be understood that fundamental principles of the invention are applicable also to the direction of other types of machines in which it is not feasible, or not desirable, to make such use of fixed stops. An example of such other machines is found in duplicator machines in which the work-engaging tool travels in an irregular path determined by a model of the thing to be reproduced.

To those skilled in the relevant arts it will be apparent that the present invention is applicable to the control of a wide variety of machines and that the manner of application and the structural embodiment of the invention both as a whole and in its parts may take a wide range of equivalent forms within the bounds of the following claims.

What is claimed is:

1. In hydraulic apparatus, the combination of a fluid pressure operated motor; a source of working fluid for said motor; valve means for controlling admission of the working fluid to the motor; and automatic means for controlling the operation of the motor comprising a plurality of hydraulic transmitters each having a cylinder and a piston therein, a motor driven cam carrier, cams mounted thereon, cam follower devices associated with said cams and respectively connected to the transmitter pistons, a hydraulic receiver associated with the control valve of the aforesaid motor and connected to receive hydraulic impulses from one of the transmitters whereby the operation of the motor valve is controlled by the movement of the cam carrier, means for varying the pressure of the working fluid supplied to the hydraulic motor, and another hydraulic receiver associated with the last named means and operatively connected to another of the hydraulic transmitters whereby the movement of the cam carrier also controls the pressure of the fluid supplied to the hydraulic motor.

2. Hydraulic apparatus as claimed in claim 1, in which the means for controlling the operation of the motor also comprises means for varying the speed of the motor-driven cam carrier, and a hydraulic receiver associated with the speed varying means and operatively connected to still another of the cam-actuated hydraulic transmitters, whereby the means for controlling the operation of the motor serves to vary both the speed of the hydraulic motor and the pressure of its working fluid.

3. In hydraulic apparatus, the combination of a hydraulic motor; a source of working fluid for said motor; a valve for controlling admission and exhaust of the working fluid of the motor; means for automatically actuating the said valve comprising a hydraulic receiver operatively connected to the valve and having a follow means actuated by the movable element of the motor to cause movement of the motor proportional to the movement of the receiver, a plurality of hydraulic transmitters, conduit means for connecting one of the transmitters to the receiver to deliver pressure impulses to the latter; a movably mounted cam carrier, a plurality of cams mounted on said carrier, and operative connections between each of the said transmitters and one of the cams; means for varying the pressure of the working fluid supplied to the hydraulic motor; and means for controlling the pressure-varying means comprising a hydraulic receiver operatively connected to one of the hydraulic transmitters.

EDWARD M. MAY.

No references cited.